United States Patent [19]

Eckels

[11] 3,894,750

[45] July 15, 1975

[54] CRASH PROTECTOR FOR PASSENGER VEHICLES

[76] Inventor: Robert E. Eckels, 2101 Youngfield St., Golden, Colo. 80401

[22] Filed: Nov. 19, 1973

[21] Appl. No.: 417,279

[52] U.S. Cl. ............. 280/150 AB; 296/84 K; 222/5
[51] Int. Cl. ............................................. B60r 21/06
[58] Field of Search ................. 280/150 AB, 150 B; 296/84 K; 222/5

[56] References Cited
UNITED STATES PATENTS

| | | | |
|---|---|---|---|
| 2,806,737 | 9/1957 | Maxwell | 280/150 AB X |
| 2,854,281 | 9/1958 | Cassin | 296/84 K |
| 3,423,121 | 1/1969 | Lipkin | 280/150 B X |
| 3,664,682 | 5/1972 | Wycech | 296/84 K |
| 3,706,462 | 12/1972 | Lilly | 280/150 AB |
| 3,731,949 | 5/1973 | Radke | 280/150 AB |
| 3,749,282 | 7/1973 | Day et al. | 280/150 AB X |
| 3,787,074 | 1/1974 | Lewis et al. | 280/150 AB |

FOREIGN PATENTS OR APPLICATIONS

| | | | |
|---|---|---|---|
| 870,071 | 3/1953 | Germany | 296/84 K |

*Primary Examiner*—Kenneth H. Betts
*Attorney, Agent, or Firm*—Van Valkenburgh, Lowe and Law

[57] ABSTRACT

An overhead energy attenuating panel in a vehicle moves from an inactive position above the occupants, on the inside of the roof of the vehicle, to a position in front of the front seat passengers upon a generally headon crash, and a mound of soft material formed by the overhead protector receives and protects a person projected against it on such a crash. In one form of the invention, the mound of soft material is an air bag which inflates as the overhead panel moves between the passengers and the vehicle windshield.

6 Claims, 7 Drawing Figures

3,894,750
SHEET 1
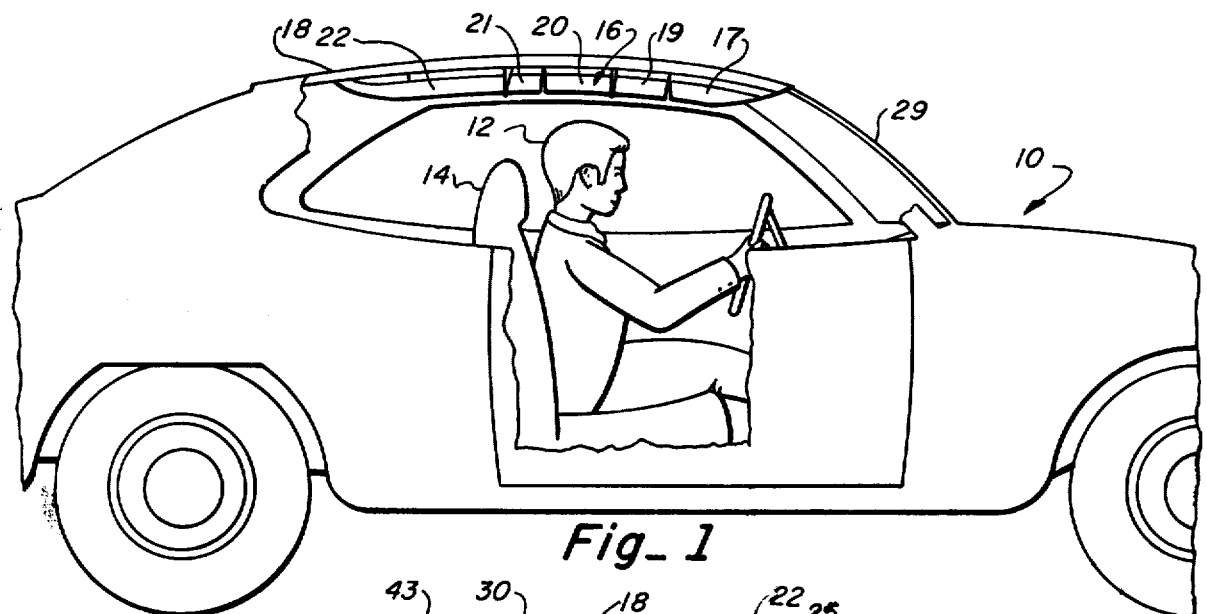
Fig_1
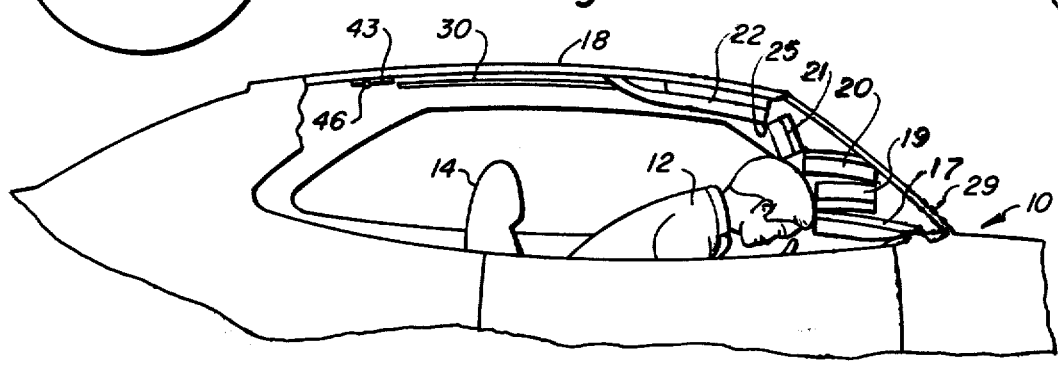
Fig_2
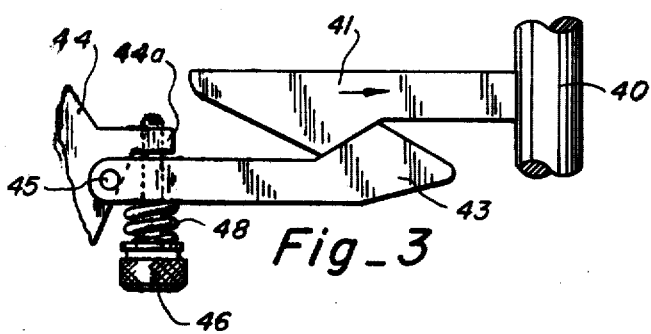
Fig_3
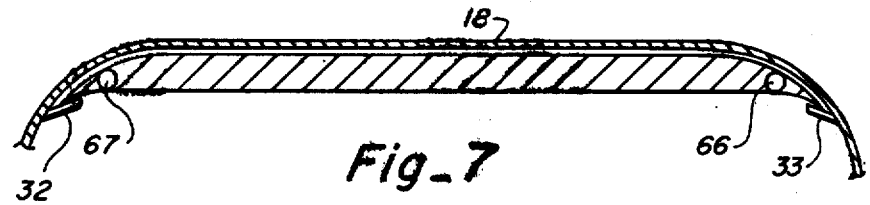
Fig_7

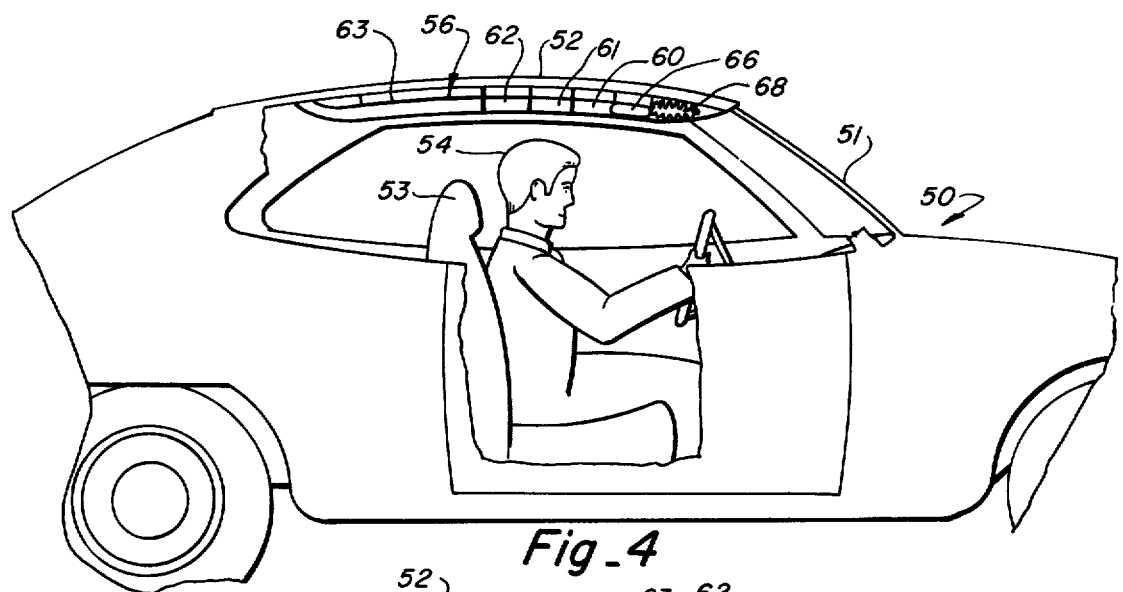
*Fig_4*
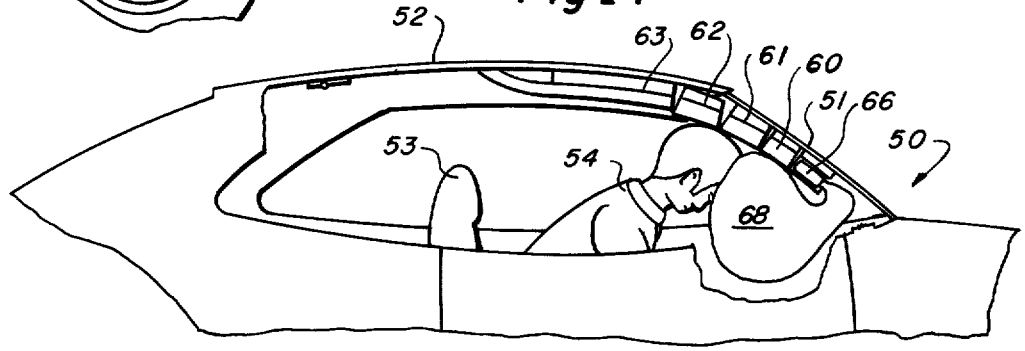
*Fig_5*
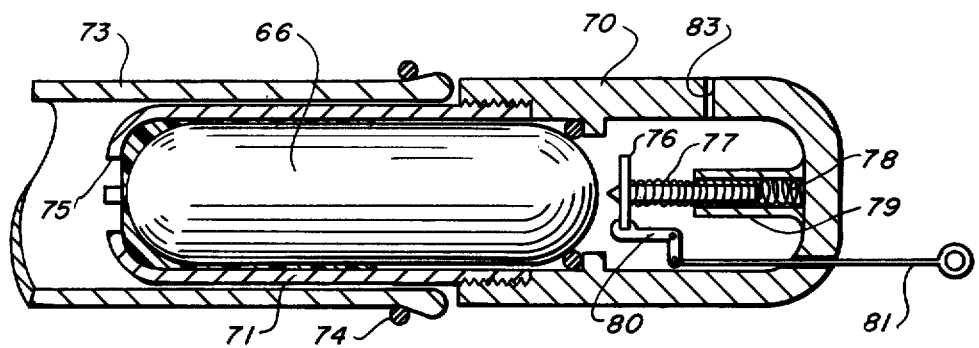
*Fig_6*

CRASH PROTECTOR FOR PASSENGER VEHICLES

This invention relates to protection devices for vehicle occupants during a generally front end collision of the vehicle with an object, and includes an impact resisting, shock attenuating panel which is mounted above both seats of the vehicle passengers to provide roll-over protection for the passengers of the vehicle. The panel is arranged to slide downwardly in front of the occupants on an impact of the vehicle, providing a mound of soft material against which the occupants may be projected during the crash of the vehicle and thereby prevent the occupant from striking the windshield or the dashboard of the vehicle. The panel may be biased toward its activated position so as to move faster than the occupant and be in position to receive the forwardly propelled occupant against the mound of soft material.

The present invention is an improvement of my vehicle passenger protector application, Ser. No. 238,455, filed Mar. 27, 1972, now U.S. Pat. No. 3,814,459.

According to the present invention, there is provided an overhead, shock attenuating crash protector which, in its passive position, is positioned adjacent the inside of the roof above the front and rear seats of the vehicle. In this position, it will provide protection for the occupants of the seats in rollovers and the like, particularly in one car accidents. When activated, the crash protector slides forwardly and downwardly, covering the windshield and the instrument panel in front of the vehicle occupants, and provides a mound of soft material which protects a passenger projected against it. Generally, the shock attenuating panel is arranged so that a portion of the panel remains over the occupants of the front seat on activation so as to at least protect the front seat passengers in the event of a roll-over. The panel of the invention is, also, arranged with its front portion forward of the vehicle front seat occupants, so that, on activation, it is already partially forward or ahead of such occupants and will be in position to be impacted by the occupant in a crash. The panel, furthermore, is arranged so that, after a crash or an inadvertent activation, the panel may be easily moved to its passive position for subsequent reuse when necessary.

In applicant's copending application, Ser. No. 238,455, there is shown a similar type of panel to the present invention wherein an articulated panel is mounted on tracks or the like secured to the inside roof of the vehicle. The panel of the present invention may be in a similar manner secured to tracks or the like on the inside roof of the vehicle, providing means for forward sliding movement of the panel along the roof on a crash and rearward movement of the panel into the tracks into a nonactivated position. The disclosure of said prior application provides one form of means for mounting panels according to the present invention in vehicles.

Included among the objects and advantages of the present invention is to provide a shock attenuator or crash protector for vehicle occupants.

Another object of the invention is to provide a crash protector activated by a forward collision of the vehicle movable from an inactive position above both seats of the vehicle to a position in front of the front seat occupants and generally against the windshield thereof.

Another object of the invention is to provide a shock attenuating panel mounted in an overhead position of the vehicle and movable to a position in front of the front seat occupants with a mound of shock attenuating material to break the impact of an occupant propelled forward by a crash.

A specific object of the invention is to provide an overhead panel which provides an air bag crash protector activated when the overhead panel moves into an activated position in front of the front seat occupant.

An additional object of the invention is to provide a shock attenuating panel which may be repositioned to its overhead passive position after actuation, to thereby provide subsequent use thereof.

A still further object of the invention is to provide a shock attenuating panel arranged to provide overhead roll-over protection for front seat occupants, as well as front impact protection between the front seat occupants and the windshield and dashboard of the vehicle.

These and other objects and advantages of the invention may be readily ascertained by referring to the following description and appended illustrations, in which:

FIG. 1 is a generally schematic, side elevational view of one form of a shock attenuating panel according to the invention mounted on the ceiling of a vehicle in its non-deployed or passive position;

FIG. 2 is a detail view of the shock attenuating panel of FIG. 1 in its activated position between a front seat occupant and the windshield of the vehicle thereof;

FIG. 3 is a detail view of one form of friction release, providing an automatic release of a shock attenuator;

FIG. 4 shows a generally schematic, side elevational view of a slightly modified form of panel illustrating its non-deployed or passive position;

FIG. 5 is a detail, generally schematic view of the panel of FIG. 4 showing its deployed position between the front seat occupants and the windshield of the vehicle and showing an inflated bag which is a part of the panel of FIG. 5;

FIG. 6 is a detail view of one form of gas generating system for inflating the air bag of FIG. 5; and FIG. 7 is a cross-sectional detail of a panel according to the invention.

In the embodiment shown in FIG. 1, a conventional two seated vehicle, shown in general by numeral 10, and a driver 12 is positioned on the front seat 14 of the driver's compartment. A shock attenuating panel member, indicated in general by numeral 16, includes a plurality of articulated blocks 17, 19, 20, 21, 22, etc., which may be formed of soft, resilient, cellular foam, formed of plastic, natural or synthetic rubber material, etc. The cellular foam blocks are secured together by means of a flexible connector 25 which permits the block to accordian together and pile up on the dashboard between the passenger 12 and a wind screen 29 of the vehicle 10.

The foam blocks are secured together by means of hinges or the like, e.g. hinge 25 between blocks 22 and 21. The hinge between every other block is on the opposite side. The blocks are formed generally rectangular, with the ends having means for mounting in a track arrangement 30, having portions mounted on opposed sides of the ceiling or inside of the roof 18. One type of track arrangement is shown in FIG. 7, wherein tracks 32 and 33 are mounted on opposite sides on the inside of the roof 18. This provides for easy movement of the panel along the track. The track members extend up to and terminate adjacent the upper end of the vehicle windshield 29 and are arranged so that the panel moves freely out of the track, sliding freely against the windshield. The soft blocks pile up on the instrument panel of the vehicle. It is noted that the panel, FIG. 1, in its undeployed position, extends over the front and rear seats of the vehicle. The front portion of the panel leaves the track when activated and is propelled forwardly against the windshield 29. As movement of the panel proceeds downwardly along the windshield, it piles up on the top of the dashboard. When the first block 17 strikes the dashboard, the remaining sections of the panel accordion to a rest position along the windshield, providing a mound or mass of soft resilient material against which the head or board of the passenger 12 can contact. This provides impact resistance and attentuation of momentum against injury for the passenger. In this configuration, the last block 22 should be provided with means to prevent completely leaving the track, and therefore stop means may be provided to prevent the panel from leaving the track and to hold it in its deployed position accordioned against the windshield.

One form of impact release is shown in FIG. 3, wherein a bar member 40 with a latch arrangement 41 is secured to the panel 22, for example. The bar is arranged to move with the panel. A second latch member 43 is pivotally secured by pivot pin 45 to a mount 44 which is secured to the roof of the vehicle. In an inactive position, the panel is held in position by means of the two latch members 41 and 43 being in contact with each other, which prevents movement of the panel and its attached member 41. The particular release depends upon a greater accumulation of energy of the panel to break the frictional hold between 41 and 43. The amount of energy necessary to maintain the latch parts 41 and 43 in contact depends on the particular coefficient of friction and surface area of the contact between the members. The friction involved is initially controlled by the material of the two latch members, the amount of surface contact, the angle between the two mating members in contact, etc. The coefficient of friction may be further increased or decreased by pressure, which in one case, may be applied by a thumb screw 46 having a spring 48 mounted thereon bearing against the latch member 43. The thumb screw 46 is threaded into boss member 44a of the mount 44. This particular type of release anticipates the ability of the driver to simply push the entire attenuator panel back up along its tracks so that it may be relatched and ready for deployment in the event of accidental or minor crash causing a deployment of the panel. It is, of course, anticipated that the release mechanism may be a shear pin, a frangible lock, or the like, either at the front or the rear of the attenuating panels.

In the modification shown in FIG. 4, a vehicle, shown in general by the numeral 50, is provided with a windshield 51 and a roof 52 enclosing the passenger compartment which includes a seat 53 in the driver's compartment supporting a driver 54. A shock attenuating panel, shown generally by numeral 56, formed of articulated sections 60, 61, 62 and 63 is mounted in tracks on the inside ceiling of the top 52, similar to the tracks 32 and 33 shown in FIG. 7. These tracks or guides permit supporting the attenuating panel on the ceiling of the vehicle and terminate adjacent to the top of the windshield 51 so that, on deployment of the panel, the panel moves freely out of the tracks or guides to slide downwardly along the windshield 51, to eventually rest on the dashboard of the vehicle.

The shock attenuating panel includes a pair of gas containers 66 and 67, shown in FIG. 7, which are attached to a folded up bag, FIG. 4, which extends along the front end of the panel adjacent the leading edge thereof. The bag 68 may be shaped so that, on inflation, it extends between the occupants of the front seat and the panel which, when deployed, is in between the passengers and the windshield 51.

One form of gas source for the bag 68 is shown in FIG. 6, wherein a bottle 66, of glass or other frangible material, is mounted in a holder which includes a head portion 70 and a threaded body portion 71. The gas bottle 66 is mounted internally therein. A flexible tube 73 is secured to the body by means of a ring 74 so that compressed gas released from the bottle 66 expands into the air bag 68. The body 71 includes an opening 75 of fairly large dimensions so as to provide a reduced restriction of gas from the bottle 66 into the tubing 73. The frangible bottle 66 may be broken by means of a hammer 76 mounted in holder 79 and is spring loaded by means of a spring 77 bearing against the head 70 at spring end 78. A latch 80 holds the hammer 76 in deactivated position until the latch is released by means of an activator 81 which is activated as the panel starts to move, as by attaching it to the vehicle roof, to release the compressed gas from the bottle into the air bag prior to the occupant striking the same. The member 70 includes a small bleed hole 83 for slowly releasing the gas from the bag after activation, so as to deflate the air bag. The frangible container permits high speed bag filling, while the panel is moving.

The construction of the air or compressed gas bottles anticipates the use of glass or other frangible material of sufficient strength to contain necessary gas for inflating the protective bag 68. Where two such bottles are used, their combined capacity will be sufficient to inflate the bag. The gas container may be secured in a wire screen through which the gas is easily released, but it retains the larger pieces of the broken container. With the two gas bottles, sufficient gas is provided to completely inflate the protective bag; however, if one bottle fails to activate, the single activated bottle provides partial inflation which still provides protection for the individual. If both gas sources fail, the shock attenuating panel still provides protection for the front seat occupants, and prevents them from being impelled against the windshield. With the panels made of soft, resilient plastic, the occupants are protected from impact even though the gas sources fail to inflate the bag. Furthermore, the gas systems are easily recharged by simply removing the head, removing the debris from the first actuation and then replacing the bottle with a fresh bottle of compressed gas. The double protection system of the panel and the gas bag is very important, since the gas bag system might require some maintenance and periodic checking for its functionability; however, failure to accomplish such maintenance will not leave an unattended hazard for the automobile occupants, since the panel remains in its position ready for deployment in the event of a front end collision or roll-over for all of the occupants of the automobile.

In the event it is desired, additional propulsive power to the inertia system of the panel may be provided, as for example, springs or the like may be used for propelling the panel into a position in front of the occupants of the vehicle. Springs and the like for aiding panel movement have been shown in my copending application.

In either form of the invention, the shock attenuating panel moves from its inert or passive position above the occupants of the vehicle to its deployed position in front of the occupants and between them and the windshield and dashboard of the vehicle. In both cases, a mound of soft material is provided as added protection in decelerating and attenuating the propulsive movements of the passengers during a crash. The mound of soft material will provide protection against injury to the occupants, but is easily returned to its passive position if accidentally triggered or if actuated by a minor collision without substantial damage to the vehicle. Also, of advantage is the fact that the panel is placed in the ceiling over the occupants of the vehicle to provide roll-over protection in the event of one car accident where the vehicle leaves the roadway and rolls over without an actual crash occurring.

I claim:

1. In a crash protector for roofed vehicles in which an articulated, shock attenuating multi-segment panel means is mounted on tracks and is mounted generally flat adjacent the inside roof of the vehicle and is slidable forwardly and downwardly along the tracks to a position between passengers and the vehicle windshield on impact of the vehicle, the improvement of means including a gas bag inflatable on the sliding deployment of said panel means on impact of the vehicle whereby said panel and said inflated bag are positioned between the vehicle windshield and passengers to receive passengers and attenuate their impact energy, and at least one container for inflating gas mounted in said panel means.

2. The improvement of claim 1 wherein said at least one container is frangible.

3. The improvement of claim 2 wherein said at least one container is mounted with breaking means interconnected with the roof of said vehicle arranged to break said at least one container and inflate said gas bag during the sliding deployment of said panel means.

4. The improvement of claim 3 wherein said breaking means is hammer means interconnected with the roof of the vehicle to break said at least one container on initial movement of said panel.

5. The improvement of claim 1 wherein two gas containers are mounted in said panel and both connected to said bag.

6. The improvement of claim 5 wherein the capacity of each of said containers is sufficient to fill said bag sufficiently to attenuate the impact energy of a passenger.

* * * * *

UNITED STATES PATENT OFFICE
CERTIFICATE OF CORRECTION

PATENT NO. : 3,894,750
DATED : July 15, 1975
INVENTOR(S) : Robert E. Eckels

It is certified that error appears in the above-identified patent and that said Letters Patent are hereby corrected as shown below:

Column 3, line 14 change "board" to --body--.

Signed and Sealed this thirtieth Day of September 1975

[SEAL]

Attest:

RUTH C. MASON
Attesting Officer

C. MARSHALL DANN
Commissioner of Patents and Trademarks